United States Patent
Hino et al.

(10) Patent No.: US 11,652,546 B2
(45) Date of Patent: *May 16, 2023

(54) OPTICAL NETWORK SYSTEM, OPTICAL NODE DEVICE, AND OPTICAL NETWORK CONTROL METHOD

(71) Applicant: NEC Corporation, Tokyo (JP)

(72) Inventors: Tomoyuki Hino, Tokyo (JP); Akio Tajima, Tokyo (JP); Hitoshi Takeshita, Tokyo (JP); Shinsuke Fujisawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,717

(22) Filed: Nov. 5, 2021

(65) Prior Publication Data

US 2022/0060257 A1 Feb. 24, 2022

Related U.S. Application Data

(63) Continuation of application No. 16/903,691, filed on Jun. 17, 2020, now Pat. No. 11,201,668, which is a (Continued)

(30) Foreign Application Priority Data

Mar. 27, 2015 (JP) ................................ 2015-065717

(51) Int. Cl.
*H04B 10/079* (2013.01)
*H04J 14/02* (2006.01)

(52) U.S. Cl.
CPC ..... *H04B 10/0795* (2013.01); *H04B 10/0793* (2013.01); *H04J 14/0213* (2013.01);
(Continued)

(58) Field of Classification Search
None
See application file for complete search history.

(56) References Cited

U.S. PATENT DOCUMENTS

| 8,009,985 B1 | 8/2011 | Roberts | H04L 1/0017 398/47 |
| 10,715,249 B2 * | 7/2020 | Hino | H04J 14/0263 |

(Continued)

FOREIGN PATENT DOCUMENTS

| JP | 2004-112781 A | 4/2004 |
| JP | 2006513672 A | 4/2006 |

(Continued)

OTHER PUBLICATIONS

Sekiya et al: "Photonic Network Defragmentation Technology Improving Resource Utilization during Operation" Fujitsu Sci. Tech. J., vol. 50, No. 1, pp. 101-109, Jan. 2014 (Year: 2014).*

(Continued)

*Primary Examiner* — Li Liu
(74) *Attorney, Agent, or Firm* — Sughrue Mion, PLLC

(57) ABSTRACT

If wavelength defragmentation is performed during the operation of an optical network, an instantaneous interruption of a network arises; consequently, data are lost; therefore, an optical network control method according to an exemplary aspect of the present invention includes monitoring a data volume of a client signal to be transmitted using a plurality of optical subcarriers; and performing synchronously, depending on a variation in the data volume, an optical subcarrier changing process of changing an active optical subcarrier, of the plurality of optical subcarriers, to be used for transmitting the client signal, and a remapping process of remapping the client signal onto an active optical subcarrier after having been changed.

4 Claims, 9 Drawing Sheets

Related U.S. Application Data continuation of application No. 15/559,899, filed as application No. PCT/JP2016/001587 on Mar. 18, 2016, now Pat. No. 10,715,249.

(52) U.S. Cl.
CPC ...... *H04J 14/0227* (2013.01); *H04J 14/0256* (2013.01); *H04J 14/0257* (2013.01); *H04J 14/0263* (2013.01); *H04B 2201/70703* (2013.01); *H04J 2203/0069* (2013.01)

(56) References Cited

U.S. PATENT DOCUMENTS

| | | | | |
|---|---|---|---|---|
| 11,201,668 B2* | 12/2021 | Hino | .................... | H04J 14/0227 |
| 2004/0156644 A1* | 8/2004 | Yasue | ................. | H04B 10/5059 398/198 |
| 2011/0164620 A1 | 7/2011 | Jinno | .................... | H04J 14/0204 370/392 |
| 2012/0176990 A1 | 7/2012 | Zou | ........................ | H04L 5/0037 370/329 |
| 2012/0251117 A1 | 10/2012 | Patel | ..................... | H04J 14/0267 398/79 |
| 2012/0321306 A1 | 12/2012 | Wellbrock | .......... | H04J 14/0227 398/48 |
| 2013/0004163 A1 | 1/2013 | Aoki | ..................... | H04B 10/572 398/34 |
| 2013/0209091 A1 | 8/2013 | Mateosky | ........ | H04B 10/07953 398/26 |
| 2013/0336655 A1 | 12/2013 | Grobe | ................. | H04J 14/0282 398/67 |
| 2014/0205281 A1 | 7/2014 | Sone | .................... | H04J 14/0221 398/25 |
| 2015/0055664 A1 | 2/2015 | Kanonakis | ............. | H04Q 11/00 370/535 |
| 2015/0207583 A1* | 7/2015 | Nakajima | ........... | H04J 14/0212 398/79 |
| 2015/0244493 A1 | 8/2015 | Cugini | ................ | H04J 14/0227 398/79 |
| 2016/0094306 A1 | 3/2016 | Nakajima | ........... | H04J 14/0221 398/82 |
| 2016/0241936 A1 | 8/2016 | Nagamine | ............ | H04B 10/654 |
| 2016/0381441 A1 | 12/2016 | Nagamine | ............ | H04B 10/572 398/95 |
| 2017/0180073 A1 | 6/2017 | Takeshita | ............ | H04J 14/0224 |

FOREIGN PATENT DOCUMENTS

| | | |
|---|---|---|
| JP | 2006060571 A | 3/2008 |
| JP | 2008-167177 A | 7/2008 |
| JP | 2010-245809 A | 10/2010 |
| JP | 2013-016994 A | 1/2013 |
| JP | 2014-143614 A | 8/2014 |
| JP | 2014-179864 A | 9/2014 |
| JP | 2014-192642 A | 10/2014 |
| JP | 2015-019289 A | 1/2015 |
| JP | 2015-139071 A | 7/2015 |
| JP | 6852824 B2 | 3/2021 |
| WO | 2010032844 A1 | 3/2010 |
| WO | 2012057095 A1 | 5/2012 |
| WO | 2012-147889 A1 | 11/2012 |

OTHER PUBLICATIONS

Motoyoshi Sekiya et al. "Photonic Network Defragmentation Technology Improving Resource Utilization during Operation", Fujitsu vol. 64, No. 5, Sep. 2013, (pp. 564-572).

Guoying Zhang et al., "A Survey on OFDM-Based Elastic Coro Optical Networking", IEEE Communications Surveys & Tutorials, vol. 15, No. 1, First Quarter 2013, (pp. 65-87).

International Search Report, issued by International Searching Authority in corresponding International Application No. PCT/JP2016/001587, dated May 17, 2016.

Sunny Shakya et al., "Virtual Network Embedding and Reconfiguration in Elastic Optical Networks", Globecom 2014, Optical Networks and Systems Symposium (pp. 2160-2165).

Hung Nguyen Tan et al . "Seamless Spectral Defragmentation of Nyquist OTDM-WDM Signals in Add-Drop Node for All-Optical Elastic Network", National Institute of Advanced Industrial Science and Technology, Sep. 2013 (3 pages total).

Toshio Kato et al . "Proposal of Hierarchic IP/WDM Network with wavelength path switching", The Institute of Electronics. Information and Communication Engineers. Oct. 2000, (pp. 52-57).

Written Opinion issued by the International Bureau in corresponding International Application No. PCT/JP2016/001587, dated May 17, 2016.

Japanese Office Action for JP Application No. 2020-025790 dated Feb. 9, 2021 with English Translation.

Japanese Office Communication for JP Application No. 2021-037894 dated Feb. 1, 2022 with English Translation.

Japanese Office Action for JP Application No. 2022-027531 dated Jan. 24, 2023 with English Translation.

Fujisawa et al., "Utilization of spectrum slot fragmentation to improve network resource efficiency on elastic optical network", 2015 Optical Fiber Communications Conference and Exhibition (OFC), The U.S. and Optical Society of America, Mar. 2015, and Th2 A.45.

* cited by examiner

OPTICAL NETWORK SYSTEM, OPTICAL NODE DEVICE, AND OPTICAL NETWORK CONTROL METHOD

REFERENCE TO RELATED APPLICATION

The present application is a continuation application of U.S. patent application Ser. No. 16/903,691 filed on Jun. 17, 2020, which is a continuation application of U.S. patent application Ser. No. 15/559,899 filed on Sep. 20, 2017, which is issued as U.S. Pat. No. 10,715,249, which is a National Stage Entry of PCT/JP2016/001587 filed on Mar. 18, 2016, which claims priority from Japanese Patent Application 2015-065717 filed on Mar. 27, 2015, the contents of all of which are incorporated herein by reference, in their entirety.

TECHNICAL FIELD

The present invention relates to optical network systems, optical node devices, and optical network control methods and, in particular, to an optical network system, an optical node device, and an optical network control method that use the multicarrier transmission scheme.

BACKGROUND ART

Because of a rapid increase in video content services typified by video streaming services in addition to a rapid spread of advanced terminals and the like, the transmission capacity in networks is drastically increasing.

Against such a background, it is studied nowadays to introduce a multi-layer network composed of a plurality of layers to communication carrier networks. An example of the multi-layer network is a configuration in which a packet network in an upper layer is combined with an optical network in a lower layer. Here, among adjacent layers hierarchized as service networks, a network located at a relatively upper level is referred to as an upper layer, and a network located at a relatively lower level is referred to as a lower layer.

The upper-layer network is a network configured by using the Internet protocol (IP) or the multi-protocol label switching (MPLS) technologies, for example. The IP network is characterized by efficient use of network resources due to the statistical multiplexing effect. In contrast, the optical network of the lower-layer network is suitable for long-haul high-capacity transmission. In general, the network is controlled independently with respect to each layer. However, it is expected to maximize efficiency in the use of the network resources and reduce operational costs by integrating these two types of network layers and controlling the network efficiently in response to the traffic demand.

In order to meet a growing traffic demand, it is being studied, in addition to the introduction of the multi-layer network mentioned above, to introduce new optical network concepts and network operational methods. Such examples include elastic network technologies and dynamic network operational technologies.

In the optical network of the lower-layer, the elastic network technology is introduced increasingly by which the network can be utilized more flexibly. The elastic network technology is a technology that enables the transmission with minimum frequency band for the transmission distance and the transmission throughput by making variable the modulation scheme in the optical layer, which was fixed conventionally. This makes it possible to maximize the usage efficiency of optical network resources such as wavelength resources in an optical fiber. The greatest characteristic of the elastic network technology is that the transmission granularity in the optical layer can be improved by introducing the concept of frequency slot with fine granularity of 12.5 GHz instead of the conventional fixed grid such as 100 GHz and 50 GHz. Hence, it is thought that a multicarrier transmission scheme become mainstream in the future which transmits signals through a plurality of physical media such as a plurality of optical carriers in the optical layer.

With regard to the network operational technology, it is expected to operate the network dynamically in contrast to the conventional fixed network operation. This is accounted for by the increase in a variation of the traffic of a client to be accommodated in networks. It is expected that the dynamic operation of optical networks can improve the network usage efficiency.

However, it is pointed out that the introduction of the above-mentioned elastic network technology and dynamic network operational technology causes a fragment of wavelength bands to arise. This produces the problem that a path with a long-haul route cannot be secured in the same wavelength due to the occurrence of wavelength fragmentation even though the introduction of the elastic network technology enables the accommodation efficiency of the entire network to improve. The fragmentation means a state in which unused wavelength regions are fragmented in the wavelength usage situation of each link constituting an optical network. Technologies to resolve the wavelength fragmentation include a wavelength defragmentation technology. In general, the wavelength defragmentation technology is a technology to improve the efficiency in the wavelength usage by relocating one wavelength occupying a particular link in an optical network to the other wavelength.

Patent Literature 1 discloses an example of such wavelength defragmentation technologies. A related frequency assignment apparatus described in Patent Literature 1 selects a frequency and a route connecting a start point and an end point of an optical signal and includes a route/frequency calculation result storage means, a common free frequency information generation means, a free frequency state evaluation means, and a frequency and route determination means.

The route/frequency calculation result storage means stores route and frequency calculation results. The common free frequency information generation means extracts fibers connected to each other, and performs logical operation for logical information representing free frequency states of each of the extracted fibers so as to generate logical information on free frequency states common to fibers. The free frequency state evaluation means provides an evaluation value for the free frequency states based on the generated free frequency information common to fibers, in consideration of consecutiveness of free frequencies in the free frequency state common to fibers. The frequency and route determination means determines a frequency and passing fibers to be set as a communication route using the evaluation value calculated in the free frequency state evaluation means as a criterion, and stores the frequency and the passing fibers in the route/frequency calculation result storage means.

It is said that the configuration, according to the frequency assignment apparatus described in Patent Literature 1, makes it possible to effectively suppress occurrence of fragmentation in a transparent type optical path network, and to optimize utilization efficiency of wavelength (frequency) resources.

Related technologies are described in Patent Literature 2 to Patent Literature 4.

CITATION LIST

Patent Literature

[PTL 1] WO 2012/057095
[PTL 2] WO 2010/032844
[PTL 3] Japanese Unexamined Patent Application Publication (Translation of PCT Application) No. 2006-513672
[PTL 4] Japanese Unexamined Patent Application Publication No. 2006-060571

SUMMARY OF INVENTION

Technical Problem

The above-mentioned related frequency assignment apparatus receives a traffic transfer demand, determines a route on a network, and assigns a wavelength along the determined route. That is to say, the apparatus assigns a frequency so as to suppress the occurrence of fragmentation in initializing the network setting.

However, if such frequency assignment is performed during network operation, an instantaneous interruption of the network arises, which causes the problem that data are lost.

As mentioned above, there has been the problem that an instantaneous interruption of a network arises; consequently, data are lost, if wavelength defragmentation is performed during the operation of an optical network.

The object of the present invention is to provide an optical network system, an optical node device, and an optical network control method that solve the above-mentioned problem that an instantaneous interruption of a network arises; consequently, data are lost, if wavelength defragmentation is performed during the operation of an optical network.

Solution to Problem

An optical network control method according to an exemplary aspect of the present invention includes monitoring a data volume of a client signal to be transmitted using a plurality of optical subcarriers; and performing synchronously, depending on a variation in the data volume, an optical subcarrier changing process of changing an active optical subcarrier, of the plurality of optical subcarriers, to be used for transmitting the client signal, and a remapping process of remapping the client signal onto an active optical subcarrier after having been changed.

An optical network system according to an exemplary aspect of the present invention includes a plurality of optical node devices; and a network management device configured to have centralized control over the plurality of optical node devices, wherein the optical node device includes a client-side interface means for accommodating a client signal to be transmitted using a plurality of optical subcarriers, a cross-connect means, a line-side interface means for generating the plurality of optical subcarriers, and a control means for communicating with the network management device, and the cross-connect means includes a client signal monitoring means for monitoring a data volume of the client signal, and synchronously performs, depending on a variation in the data volume, an optical subcarrier changing process of changing an active optical subcarrier, out of the plurality of optical subcarriers, to be used for transmitting the client signal, and a remapping process of remapping the client signal onto an active optical subcarrier after having been changed.

An optical node device according to an exemplary aspect of the present invention includes a client-side interface means for accommodating a client signal to be transmitted using a plurality of optical subcarriers; a cross-connect means; a line-side interface means for generating the plurality of optical subcarriers; and a control means for communicating with the network management device, wherein the cross-connect means includes a client signal monitoring means for monitoring a data volume of the client signal, and synchronously performs, depending on a variation in the data volume, an optical subcarrier changing process of changing an active optical subcarrier, out of the plurality of optical subcarriers, to be used for transmitting the client signal, and a remapping process of remapping the client signal onto an active optical subcarrier after having been changed.

Advantageous Effects of Invention

According to an optical network system, an optical node device, and an optical network control method of the present invention, it is possible to perform wavelength defragmentation without data loss due to an instantaneous interruption of a network even when an optical network is operating.

DESCRIPTION OF EMBODIMENTS

Example embodiments of the present invention will be described below with reference to the drawings.

First Example Embodiment

An optical network control method according to the present example embodiment will be described. In the optical network control method according to the present example embodiment, first, a data volume of a client signal to be transmitted using a plurality of optical subcarriers is monitored. An optical subcarrier changing process and a remapping process are synchronously performed depending on a variation in the data volume. The optical subcarrier changing process is a process of changing an active optical subcarrier, of a plurality of optical subcarriers, to be used for transmitting the client signal. The remapping process is a process of remapping the client signal onto an active optical subcarrier after having been changed.

Figure 1A:
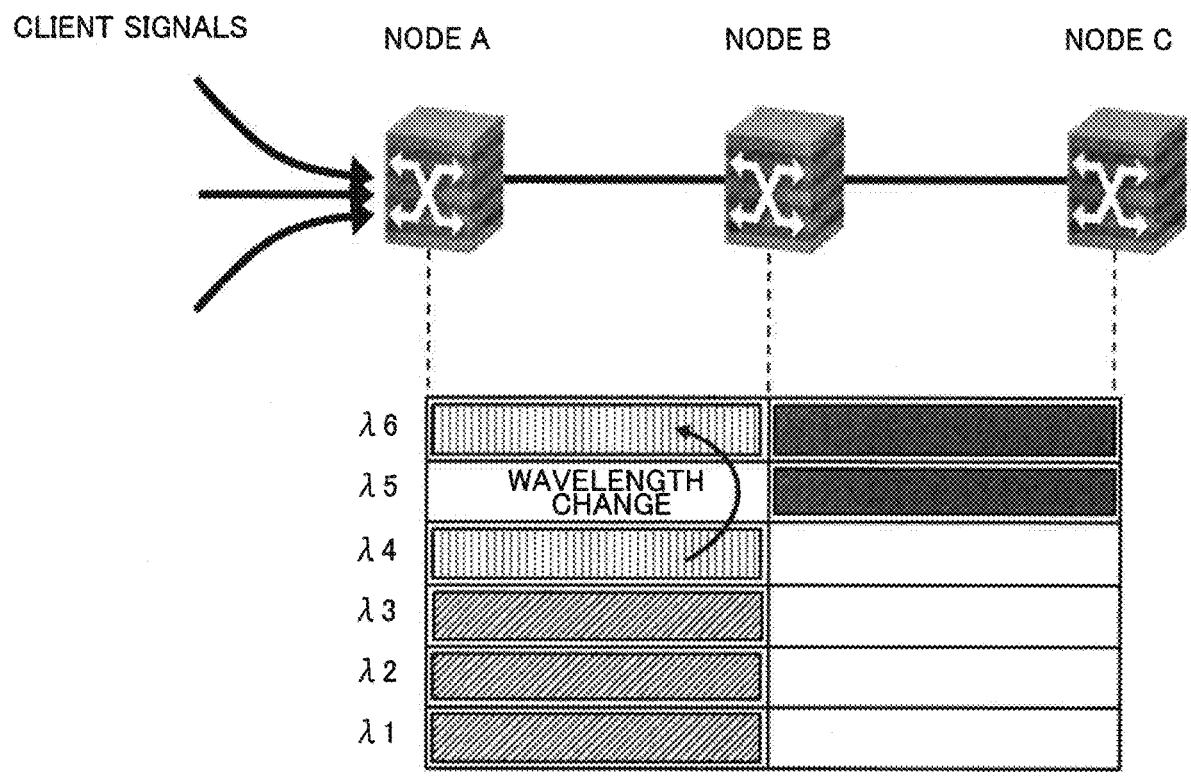
FIG. 1A is a diagram illustrating active optical subcarriers in each link to explain an optical network control method according to a first example embodiment of the present invention.
Figure 1B:
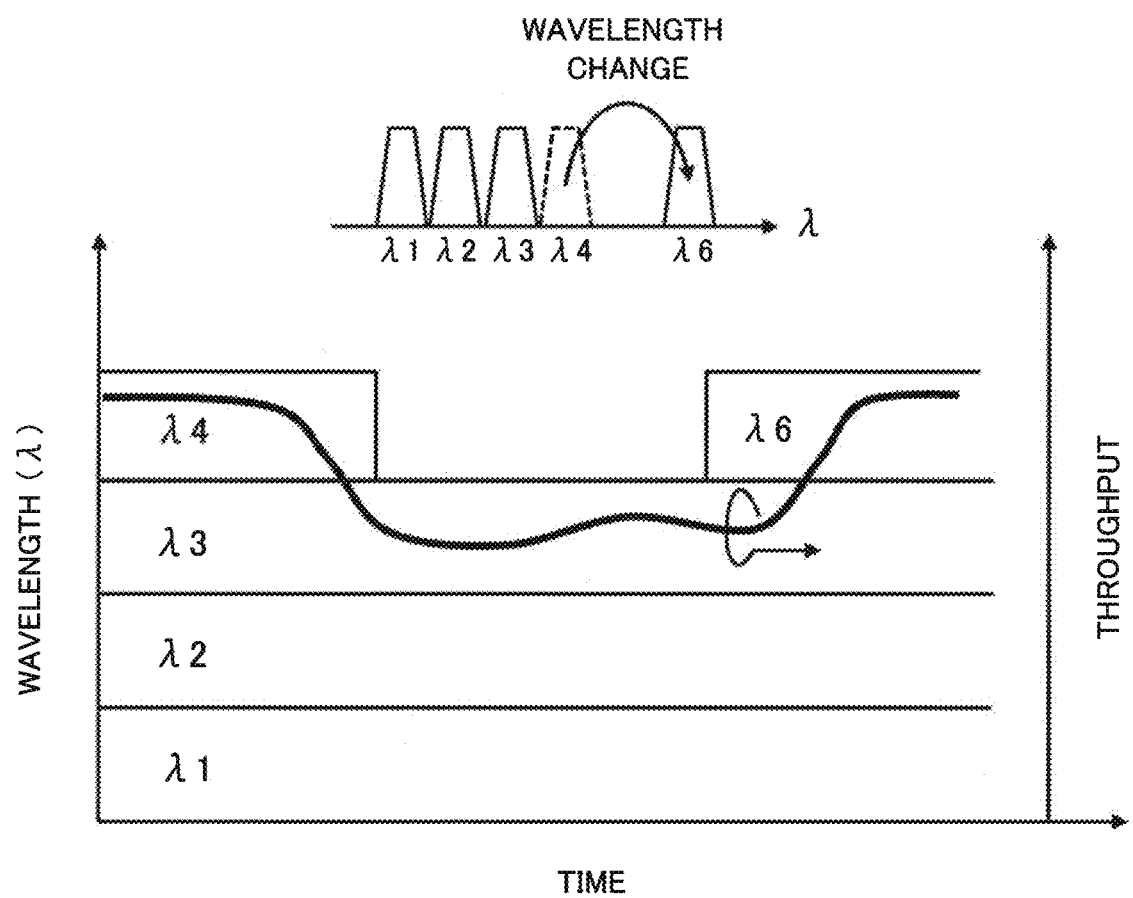
FIG. 1B is a diagram illustrating time variation in the active optical subcarrier and the throughput of a client signal to explain the optical network control method according to the first example embodiment of the present invention.

Next, the optical network control method according to the present example embodiment will be described specifically with reference to FIG. 1A and FIG. 1B. FIG. 1A is a diagram illustrating active optical subcarriers in each link, and FIG. 1B is a diagram illustrating time variation in the active optical subcarrier and the throughput of a client signal.

In the initial state, the link between node A and node B is operated by an optical multicarrier having four kinds of optical subcarrier wavelengths ($\lambda 1$, $\lambda 2$, $\lambda 3$, $\lambda 4$). In the link between node B and node C, another service is provided by using optical subcarriers having wavelengths $\lambda 5$ and $\lambda 6$. In such an initial wavelength usage situation, it is impossible to provide newly end-to-end service from node A to node C.

However, it is configured in the optical network control method of the present example embodiment to perform wavelength defragmentation by synchronously performing the optical subcarrier changing process and the remapping process depending on a variation in the data volume of a client signal. Consequently, according to the optical network control method of the present example embodiment, it is possible to perform the wavelength defragmentation without data loss due to an instantaneous interruption of a network even when an optical network is operating.
This enables the above-mentioned new service to be provided.

A more specific description will be given using the example illustrated in FIG. 1B. The above-mentioned variation in the data volume (throughput) will be described using as an example a case where the data volume decreases with the decrement of the data volume varying in excess of the transmission capacity of a single optical subcarrier. That is to say, as illustrated in FIG. 1B, it will be assumed that the client communication demand decreases by an optical subcarrier when an optical network is operating. Then, the client data are mapped and aggregated into three optical subcarriers having the wavelengths $\lambda 1$, $\lambda 2$, and $\lambda 3$, and the setting of the wavelength of the optical subcarrier having the wavelength $\lambda 4$ is changed into the wavelength $\lambda 6$ in preparation for resumption of operation. This enables the wavelength defragmentation to be performed when the optical network is operating.

As a result, as illustrated in FIG. 1A, it becomes possible to use an end-to-end link from node A to node C with the wavelength $\lambda 4$ by relocating the optical subcarrier having the wavelength $\lambda 4$ to the optical subcarrier having the wavelength $\lambda 6$.

Figure 2:
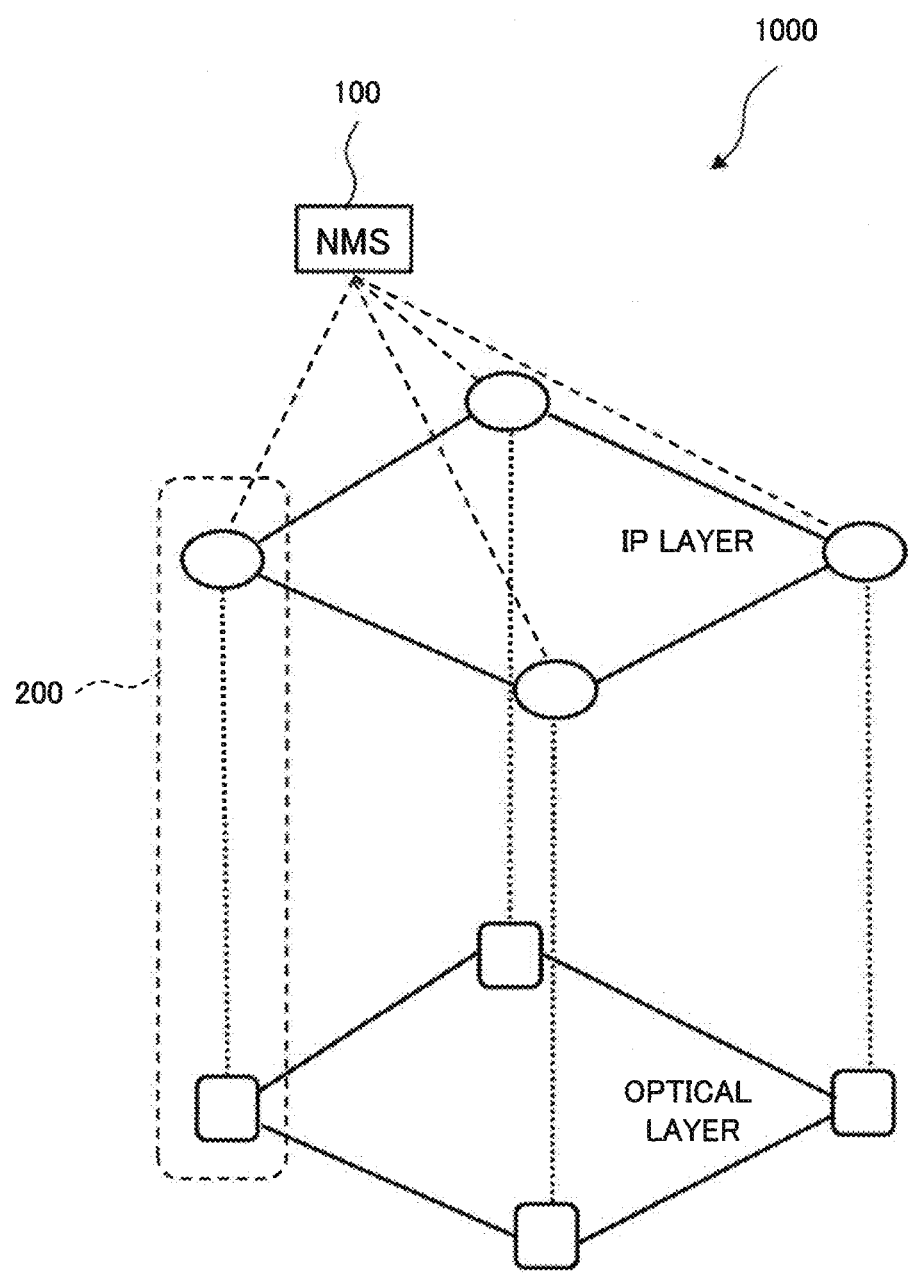
FIG. 2 is a block diagram schematically illustrating the configuration of an optical network system according to the first example embodiment of the present invention.
Figure 3:
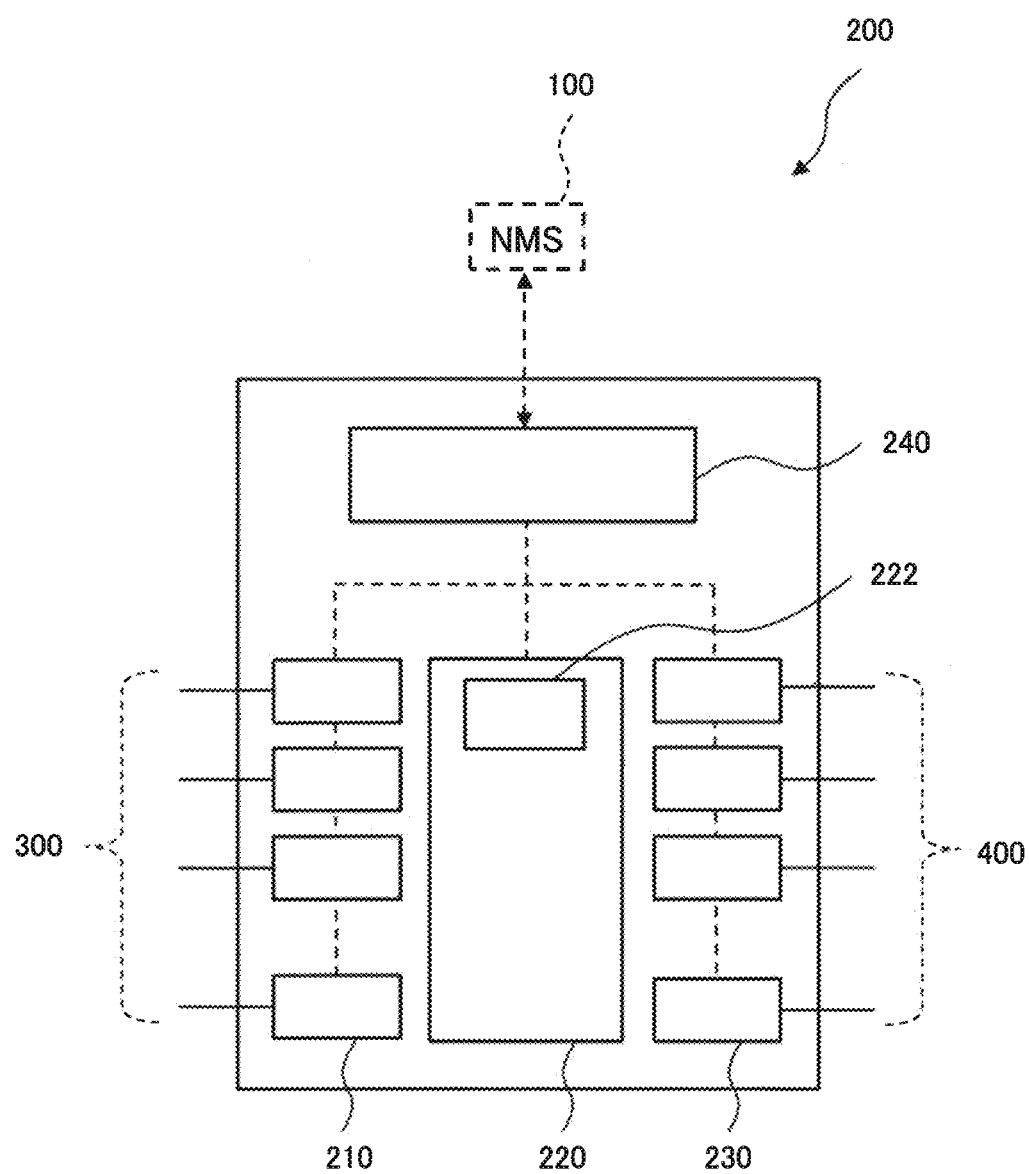
FIG. 3 is a block diagram illustrating the configuration of an optical node device constituting the optical network system according to the first example embodiment of the present invention.

Next, an optical network system according to the present example embodiment will be described. FIG. 2 is a block diagram schematically illustrating the configuration of an optical network system according to the present example embodiment. FIG. 3 is a block diagram illustrating the configuration of an optical node device constituting the optical network system according to the present example embodiment.

An optical network system 1000 according to the present example embodiment includes a network management device 100 and a plurality of optical node devices 200. The network management device 100 has the function of having centralized control over the plurality of optical node devices 200 and is implemented in a network management system (NMS), for example. As illustrated in FIG. 2, each optical node device 200 serves as a node device in which multiple layers including an optical layer and an IP layer are integrated.

As illustrated in FIG. 3, the optical node device 200 includes a client-side interface 210 configured to connect to a client-side network 300, a cross-connect section 220, a line-side interface 230 configured to connect to a backbone network 400, and a controller 240.

The client-side interface 210 accommodates a client signal to be transmitted using a plurality of optical subcarriers. The line-side interface 230 generates a plurality of optical subcarriers. The controller 240 has the function of communicating with the network management device 100.

The cross-connect section 220 includes a client signal monitor 222 configured to monitor the data volume of a client signal. An optical subcarrier changing process and a remapping process are synchronously performed depending on a variation in the data volume. The optical subcarrier changing process is a process of changing an active optical subcarrier, of a plurality of optical subcarriers, to be used for transmitting a client signal. The remapping process is a process of remapping the client signal onto an active optical subcarrier after having been changed.

The configuration of the optical node device 200 will be described in more detail subsequently.

The client-side interface 210 is capable of accommodating client data with various granularities from layer one to layer three in the OSI (open systems interconnection) reference model.

The cross-connect section 220 can perform aggregation control and fragmentation control in addition to switching control of client data to be transferred.

The client signal monitor 222 detects the data volume such as frame volume and packet volume with respect to each transfer service of a client. The client signal monitor 222 can be configured to notify the controller 240 of the variation in the data volume. The variation in the data volume includes a case where the data volume decreases with the decrement of the data volume varying in excess of the transmission capacity of a single optical subcarrier. More specifically, for example, when the client signal monitor 222 detects the data volume above a set threshold level, the client signal monitor 222 can notify the controller 240 of that effect, and the controller 240 can send it to the network management device 100. The threshold level is set typically on the basis of a throughput that can be mapped onto a single optical subcarrier.

The line-side interface 230 has the function of generating a plurality of optical subcarriers and forming a multicarrier.

Next, the operation of the optical network system 1000 and the optical network control method according to the present example embodiment will be described in more detail.

Figure 4:
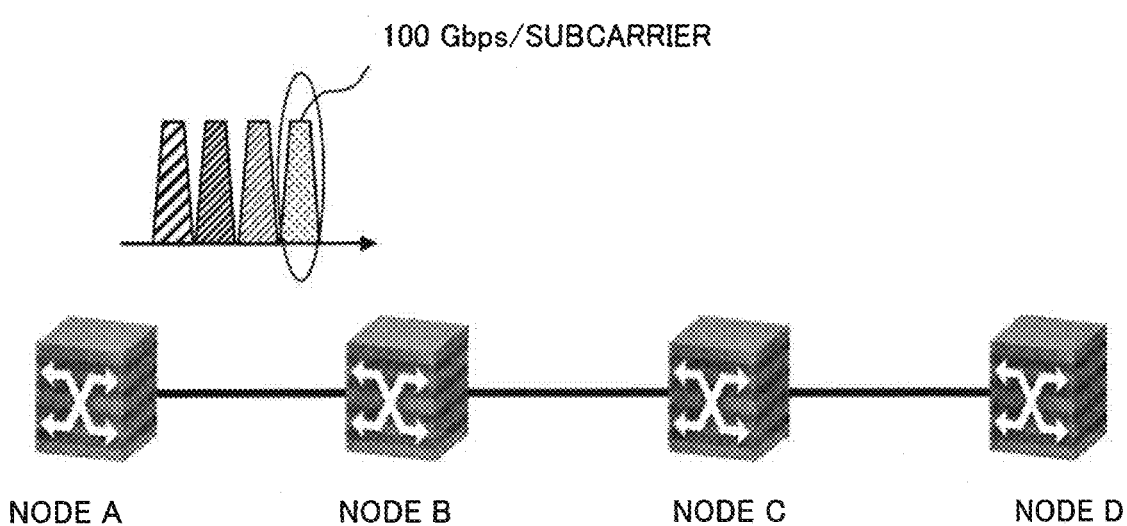
FIG. 4 is a diagram illustrating a network topology to explain the operation of the optical network system according to the first example embodiment of the present invention.

The case will be described below as an example where an optical network system has a network topology including four optical node devices with tandem connection, as illustrated in FIG. 4. The optical layer will be described using as an example a communication system where a maximum of four optical subcarriers are used each of which has a throughput of 100 Gbps, that is, the transmission is performed up to 400 Gbps.

Figure 5A:
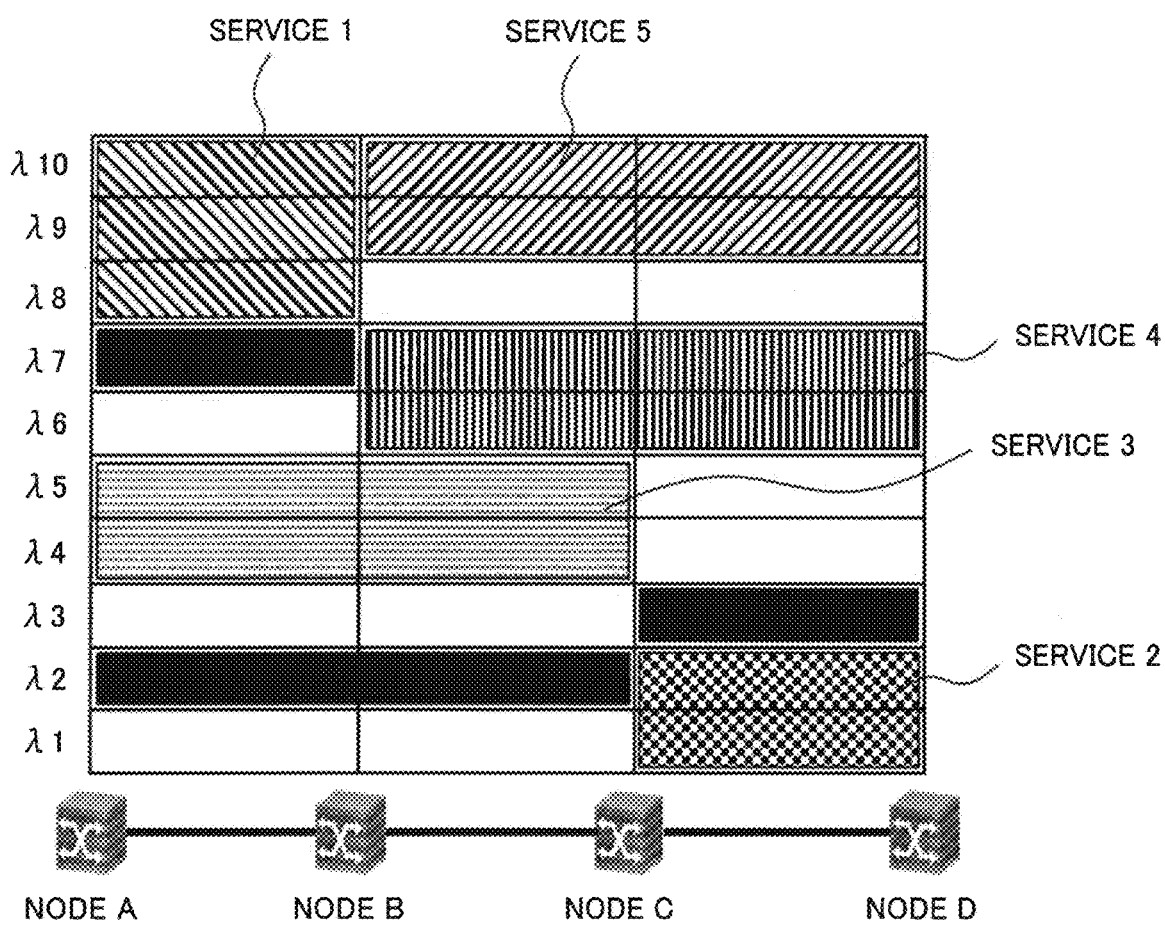
FIG. 5A is a diagram illustrating a wavelength usage situation before performing wavelength defragmentation in the optical network system according to the first example embodiment of the present invention.
Figure 5B:
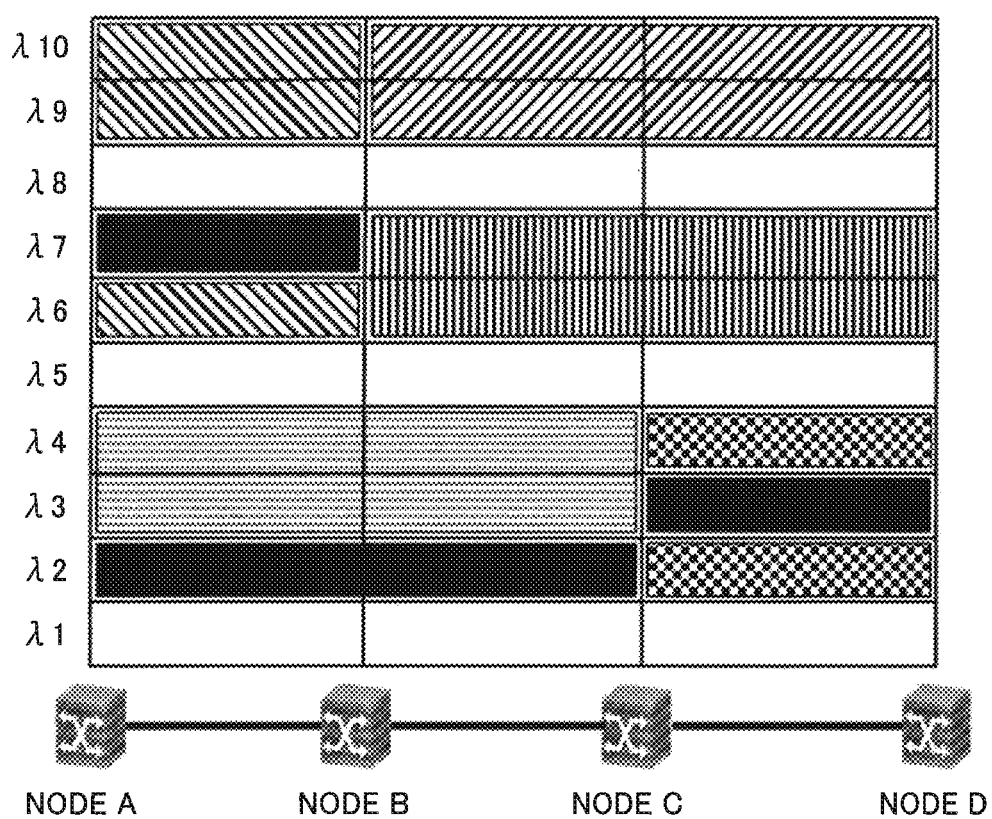
FIG. 5B is a diagram illustrating a wavelength usage situation after performing wavelength defragmentation in the optical network system according to the first example embodiment of the present invention.

FIG. 5A and FIG. 5B illustrate wavelength usage situations at a specified time in the optical network system 1000. FIG. 5A illustrates the wavelength usage situation before wavelength defragmentation, and FIG. 5B illustrates the wavelength usage situation after wavelength defragmentation. In FIG. 5A and FIG. 5B, the horizontal axes represent a link in which respective optical node devices included in node A to node D are connected in series, and the vertical axes represent operating wavelengths in each link.

As illustrated in FIG. 5A, the wavelength usage situation before wavelength defragmentation is brought to a situation where unused wavelength regions are finely fragmentated due to repetitions of service operation and stop. In the case illustrated in FIG. 5A, for example, service 1 is operated in the link from node A to node B using a multicarrier including three optical subcarriers having the wavelengths $\lambda 8$, $\lambda 9$, and $\lambda 10$. That is to say, in the wavelength usage situation illustrated in FIG. 5A, end-to-end service from node A to node D cannot be provided.

Figure 6:
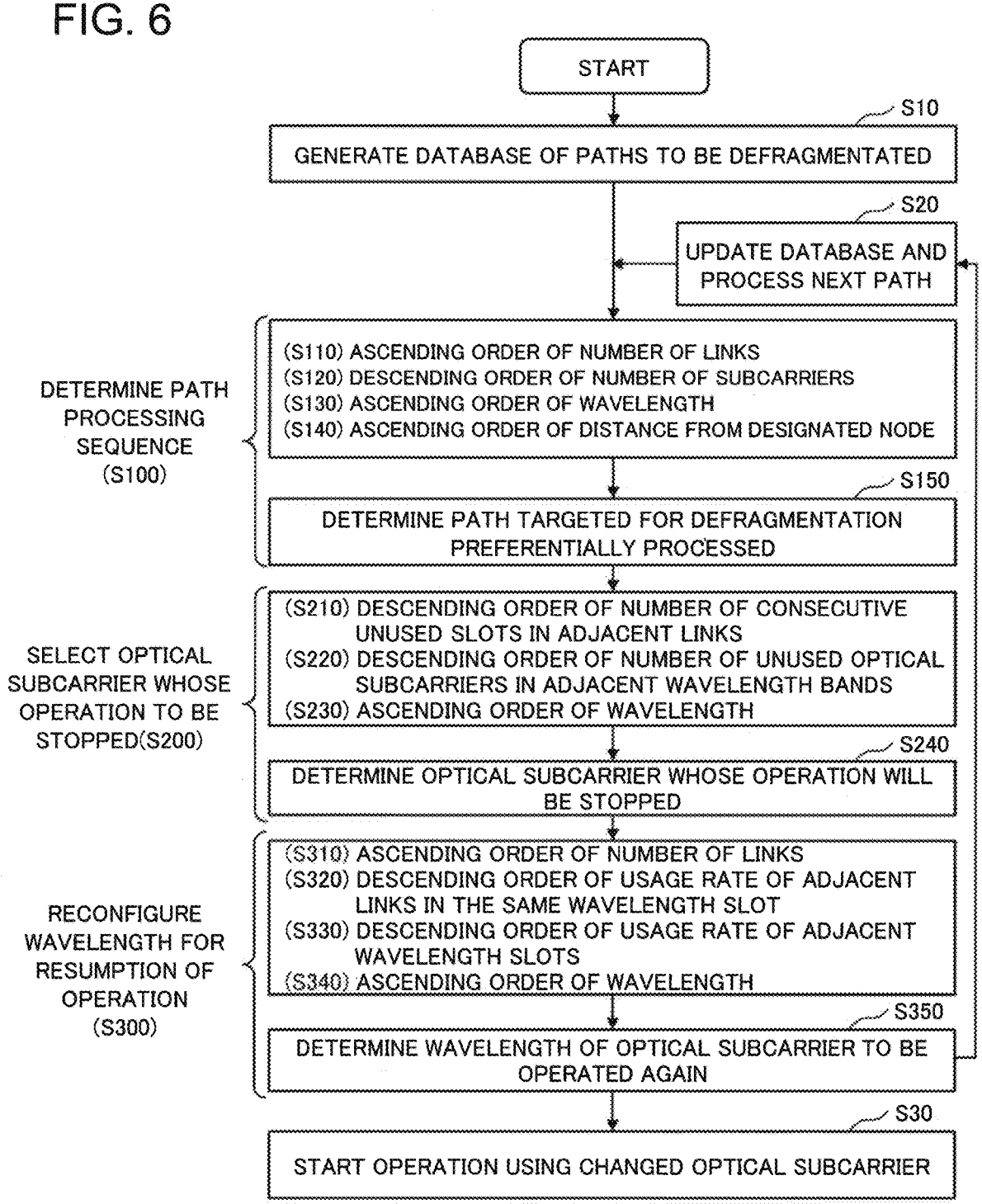
FIG. 6 is a flowchart to explain the operation of a network management device included in the optical network system according to the first example embodiment of the present invention.

Next, the operation of the network management device 100 constituting the optical network system 1000 will be described. FIG. 6 is a flowchart to explain the operation of the network management device 100.

The network management device 100 performs a process of minimizing a state in which unused optical subcarriers are fragmentated, that is, a wavelength defragmentation process.

As illustrated in FIG. 6, the operation (control algorithm) of the network management device 100 is divided into three parts. The first part is an algorithm to determine path processing sequence (step S100). The second part is an algorithm to select an optical subcarrier whose operation to be stopped included in an active optical multicarrier depending on the traffic volume of client data. That is to say, the second part is a process of selecting a change candidate optical subcarrier whose operation to be stopped from among active optical subcarriers (step S200). The third part is an algorithm to newly reconfigure the wavelength of the optical subcarrier whose operation has been stopped for resumption of operation. That is to say, the third part is a process of setting the wavelength of a changed optical subcarrier that becomes an active optical subcarrier due to the change (step S300).

First, a database of optical paths to become candidates for wavelength defragmentation, that is, a database of services, is generated (step S10). The condition of the optical path to become a candidate is that the optical path is composed of a multicarrier and has unused slots in adjacent links. It is detected that the traffic volume of a client signal exceeds a threshold value, which serves as a trigger and gets it started to extract an optical subcarrier on which wavelength defragmentation is going to be performed.

In the example illustrated in FIG. 5A, four types of services from serve 1 to serve 4 are targeted for wavelength defragmentation and stored in the database. Service 5 is also provided by the multicarrier transmission using two wavelengths; however, the service is not targeted because the adjacent links are already occupied and include no unused slots.

When the throughput of the client signal decreases, and the decrement exceeds the throughput of the single optical subcarrier, the optical node device 200 sends out a trigger signal to the network management device 100. That is to say, the time when it is determined that the transfer capability of the optical layer becomes excessive is set at the start time of the wavelength defragmentation process.

The network management device 100 first executes an algorithm to determine the processing sequence of the optical path (step S100). In this case, the process is started in ascending order of the number of links with respect to the optical paths registered in the database (step S110). If the number of links of the optical path is the same, the process is started with respect to the optical paths in descending order of the number of active subcarriers (step S120). If the number of subcarriers is also the same, the process is performed with respect to the optical paths in ascending order of the wavelength (step S130). In addition, if the wavelength is the same, the process is performed with respect to the optical paths in ascending order of distance from the optical node device with a lower-degree node number (step S140). It is completed by the above processes to determine an optical path to be targeted for the wavelength defragmentation that is preferentially processed (step S150).

Next, optical subcarriers are selected in descending order of the number of consecutive unused slots in adjacent links in the same wavelength slot from a plurality of optical subcarriers constituting the optical path that has been determined to be processed. That is to say, an optical subcarrier with a maximum number of consecutive unused optical subcarriers in adjacent links in the same wavelength band is selected as a change candidate optical subcarrier from the plurality of optical subcarriers (step S210).

If the number of unused slots is the same, optical subcarriers are selected in descending order of the number of unused optical subcarriers in adjacent wavelength slots. That is to say, an optical subcarrier with a maximum number of unused optical subcarriers is selected as a change candidate optical subcarrier from optical subcarriers in adjacent wavelength bands (step S220). This is because an optical path having a wide wavelength slot width and capable of long-haul transmission can be secured by relocating an optical subcarrier having a large number of adjacent unused wavelength slots. The number of wavelength slots is set at the total number of wavelength slots between transmitting and receiving nodes. If the number of unused wavelength slots is also the same, the process is performed in ascending order of wavelength (step S230).

By performing the above processes, an optical subcarrier whose operation will be stopped is determined (step S240). Even if threshold detection triggers to stop the operation of two optical subcarriers are simultaneously obtained, the processes can be performed by using a similar algorithm to the above-mentioned algorithm.

Next, an algorithm to reconfigure the wavelength of the optical subcarrier whose operation has been stopped for resumption of operation is executed. That is to say, the process of setting the wavelength of a changed optical subcarrier is performed (step S300).

Even in this case, as with the above-mentioned algorithm to select an optical subcarrier whose operation will be stopped, the process is started in ascending order of path distance, that is, from an active optical subcarrier with the minimum number of links (step S310).

First, set wavelengths are selected with respect to the wavelength slot in descending order of usage rate of links adjacent to the target link. That is to say, the wavelength of the changed optical subcarrier is set at the wavelength of an optical subcarrier with the maximum number of optical subcarriers in use in adjacent links in the same wavelength band (step S320).

If the number of optical subcarriers in use in adjacent links is the same, set wavelengths are selected in descending order of the number of adjacent wavelength slots in use. That is to say, the wavelength of the changed optical subcarrier is set at the wavelength of an optical subcarrier with the maximum number of optical subcarriers in use out of optical subcarriers in adjacent wavelength bands (step S330). This process is similar to the Most-used algorithm, which is a common algorithm to set a wavelength. If the number of optical subcarriers in use in adjacent wavelength bands is the same, the selection is performed in ascending order of wavelength (step S340).

By executing the above-mentioned algorithm, the wavelength of an optical subcarrier to be operated again is determined (step S350).

After that, the operation of the optical subcarrier is stopped, and the database is updated. Then the next optical path is processed (step S20). When a threshold detection trigger for the traffic volume of the client is detected, the operation is started using an optical subcarrier having a new wavelength (step S30), and the wavelength defragmentation process is completed.

The above-mentioned algorithm of wavelength defragmentation according to the present example embodiment will be specifically described below with reference to the wavelength usage situation illustrated in FIG. 5A.

In the wavelength usage situation before wavelength defragmentation illustrated in FIG. 5A, it is determined that five services from service 1 to service 5 are targeted for wavelength defragmentation control, and they are stored in the database. The case will be described below where a decrease in the throughput of the client signal is detected in each of the five services. The amount of decrease in throughput corresponds to the transmission capacity per optical subcarrier in each service. That is to say, each service uses more optical subcarriers in the optical layer than specifications by one optical subcarrier.

First, the sequence of the processes of the five services is determined. As mentioned above, services ranging between a small number of links are preferentially processed. Service 1 ranges from node A to node B, service 2 ranges from node C to node D, and the number of links is one in each service; consequently, these services are processed in priority to other services. If the number of links is the same, the process is performed in descending order of the number of optical subcarriers. Service 1 uses three optical subcarriers with the wavelengths λ8, λ9, and λ10, and service 2 uses two optical subcarriers with the wavelengths λ1 and λ2. Accordingly, the wavelength defragmentation process is preferentially performed on service 1 that uses a larger number of optical subcarriers.

Next, an optical subcarrier whose operation will be stopped is selected from among the optical subcarriers constituting service 1. As mentioned above, service 1 uses three optical subcarriers with the wavelengths λ8, λ9, and λ10. Optical subcarriers are selected from among these three optical subcarriers in descending order of the number of consecutive unused slots in adjacent links in the same wavelength slot. With regard to the optical subcarriers with the wavelengths λ9 and λ10, the number of adjacent unused slots is equal to zero because service 5 has already been operated in the adjacent link ranging from node B to node D. In contrast, with regard to the optical subcarrier with the wavelength λ8, the number of adjacent unused slots is equal to two because there is no service operated in the adjacent link ranging from node B to node D. As a result, it is determined that the optical subcarrier with the wavelength λ8 in the optical subcarriers constituting service 1 is an optical subcarrier whose operation will be stopped (change candidate optical subcarrier).

Next, a wavelength used in resumption of operation will be set. As relocation candidates for the optical subcarrier with the wavelength λ8 constituting service 1, there are three wavelength slots with λ1, λ3, and λ6. First, set wavelengths are selected from among these three wavelengths in descending order of usage rate of wavelength slot in links adjacent to the target link. That is to say, the usage rate with regard to the wavelengths λ1 and λ3 is equal to zero because the adjacent links are unused, and the usage rate with regard to the wavelength λ6 is equal to one because service 4 is operated in the adjacent link ranging from node B to node D. Hence, the wavelength λ6, at which the usage rate in adjacent links is higher, is set at a wavelength to be reconfigured.

With regard to service 2 to be targeted for the wavelength defragmentation control subsequently to service 1, the process is also performed using a similar algorithm. In service 2, the optical subcarrier with the wavelength λ1 is targeted for the wavelength defragmentation by an algorithm similar to that for service 1. The wavelengths of relocation candidates at the resumption of operation are narrowed down to λ4 and λ5 from λ4, λ5, and λ8 to be candidates based on the usage rate of the adjacent link. Because the usage rate of the adjacent wavelength is also the same with regard to both these wavelengths, the shorter wavelength λ4 is selected as a relocation destination.

With regard to service 3 and service 4, the process is performed in ascending order of wavelength because the number of links and the number of optical subcarriers are the same. In this case, service 3 becomes a next target to be processed. Service 3 is operated using two optical subcarriers having the wavelengths λ4 and λ5. The optical subcarrier having the wavelength λ1 operated in service 2 is relocated to the adjacent link with the wavelength λ4 between node C and node D. Comparing the number of adjacent unused wavelength slots, it becomes equal to zero for λ4 and one for λ5; consequently, the optical subcarrier having the wavelength λ5 becomes an optical subcarrier whose operation will be stopped. With regard to service 4, the optical subcarrier having the wavelength λ6 is a target to be processed; however, it does not become a candidate for the wavelength defragmentation because it reaches a state ex-post facto in which there is no unused wavelength slot in adjacent links.

By the wavelength defragmentation process using the above-mentioned algorithm, the wavelength usage situation after the wavelength defragmentation reaches the state illustrated in FIG. 5B. The wavelength usage situations before the wavelength defragmentation (FIG. 5A) and after the wavelength defragmentation (FIG. 5B) will be compared below. Although there is no consecutive wavelength bands from node A to node D before the wavelength defragmentation, it becomes possible to secure consecutive wavelength bands in three wavelength bands of the wavelengths λ1, λ5, and λ8 after the wavelength defragmentation.

Next, a band control technology according to the present example embodiment will be described.

As mentioned above, depending on the wavelength usage situation managed by the network management device 100, a particular optical subcarrier included in a multicarrier is selected as a target for the wavelength defragmentation. Therefore, it is necessary as the band control technology to change the number of optical subcarriers and corresponding mapping table of client data.

That is to say, the optical node device 200 performs an optical subcarrier changing process based on the results of the process of selecting a change candidate optical subcarrier and the process of setting the wavelength of a changed optical subcarrier, and performs a remapping process as well. The remapping process includes a process of remapping a client signal onto an optical subcarrier other than a change candidate optical subcarrier out of a plurality of optical subcarriers.

In the present example embodiment, a band control technology uninterruptedly using the synchronization technology for transmission frames is employed. In order to change the number of optical subcarriers uninterruptedly, it is necessary to dynamically change the frame synchronization condition of optical subcarriers to be transmitted through a plurality of lanes and the condition for mapping client data onto an optical subcarrier. The synchronization condition of transmission frames in a plurality of lanes can be achieved by extending the LCAS (link capacity adjustment scheme) technology in SDH (synchronous digital hierarchy) transmission to the OTN (optical transport network). The LCAS is a technology designed to increase and decrease the bandwidth of layer 1 configured by the GFP (generic framing procedure) or VCAT (virtual concatenation) uninterruptedly. That is to say, the LCAS technology is a technology designed to change the number of transmission lanes uninterruptedly by switching between lanes synchronously between a transmitting node and a receiving node.

The condition for mapping client data onto an optical subcarrier is achieved by updating a transfer table of data held in the cross-connect section in conjunction with the above-mentioned frame synchronization. This makes it possible to change the mapping condition uninterruptedly.

The case will be described where the MAC (media access control) frame in layer 2 is accommodated in the OTU frame of layer 1 and transmitted. If the maximum throughput of layer 2 data is larger than the throughput of a single optical subcarrier, the transmission frame of client data is divided into a plurality of processing lanes by the fragmentation process of MAC frame and then mapped onto a plurality of optical subcarriers. If the client data volume decreases, the cross-connect section 220 in the optical node device 200 changes a processing table for the fragmentation process in order to decrease the number of output lanes. Concurrently with the change in the processing table, lane change information is sent to a counter node, and the number of lanes is switched simultaneously between the transmitting node and the receiving node. This makes it possible to change the number of lanes uninterruptedly.

In this manner, the optical node device 200 according to the present example embodiment performs an optical subcarrier changing process and a remapping process synchronously. The optical subcarrier changing process is a process of switching transmission lanes to transmit optical subcarriers synchronously between a transmitting side and a receiving side. The remapping process is a process of updating the transfer table of client signals synchronously between the transmitting side and the receiving side.

At the resumption of operation, likewise, change information on the number of lanes is sent to the counter node using an increase in the client signal as a trigger signal, and the number of lanes is switched simultaneously between the transmitting side and the receiving side. At the same time, the cross-connect section in each of the transmitting and receiving nodes performs a process of changing the processing table.

That is to say, a case where the data volume decreases and then increases is regarded as the variation in data volume. In this case, the optical subcarrier changing process is a process of adding a changed optical subcarrier to an active optical subcarrier. The remapping process is a process of remapping a client signal onto the changed optical subcarrier and an optical subcarrier other than a change candidate optical subcarrier of a plurality of optical subcarriers.

As mentioned above, according to the optical network system, the optical node device, and the optical network control method of the present example embodiment, it is possible to perform wavelength defragmentation without data loss due to an instantaneous interruption of a network even when an optical network is operating.

Second Example Embodiment

Next, a second example embodiment of the present invention will be described. The second example embodiment differs from the first example embodiment in an accommodation form of a client signal. Although the case is described in the first example embodiment where a single type of client signal is processed, a case will be described in the present example embodiment where the client signal includes many different types of client signals. That is to say, a case will be described where a plurality of client services are accommodated with the same destination in the communication between the same transmitting node device and the same receiving node device. Because the configurations of an optical network system and an optical node device, and a control algorithm in the present example embodiment are the same as those in the first example embodiment, their descriptions are not repeated.

The case will be described in the present example embodiment where the client signals are a plurality of client data such as an LSP (label switched path) in the MPLS-TP (multi-protocol label switching-transport profile). The plurality of client data as described above are mapped onto a plurality of optical subcarriers and transmitted with the same destination, as is the case with the first example embodiment.

If the throughput of particular client data such as an LSP in the MPLS-TP out of a plurality of client data decreases, the particular client data are relocated and mapped onto an optical subcarrier onto which other client data (LSP) have been already mapped. Then the operation of the optical subcarrier is stopped that becomes unused after the client data is relocated.

A more detailed description will be given below with reference to FIG. 7A, FIG. 7B, and FIG. 7C.

Figure 7A:
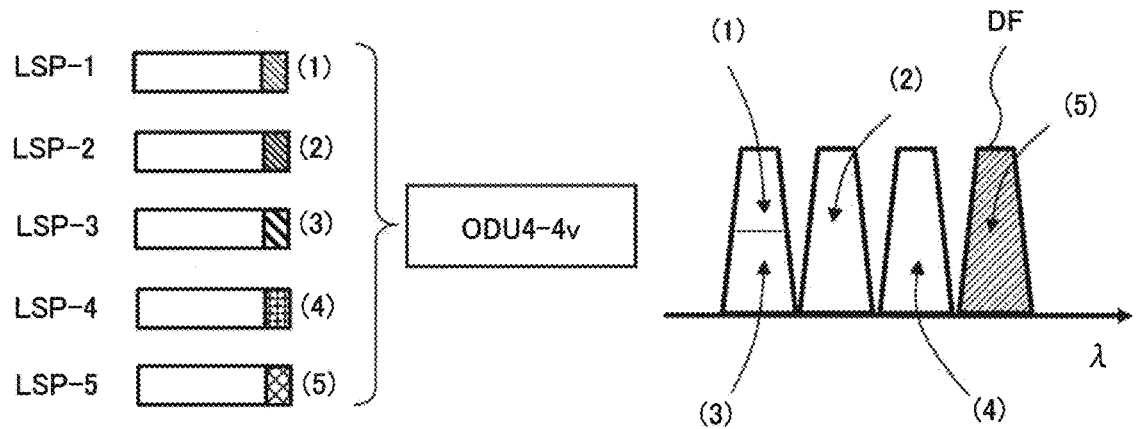
FIG. 7A is a diagram illustrating a wavelength usage situation before a stop of the operation of an optical subcarrier in the optical network system according to a second example embodiment of the present invention.

FIG. 7A illustrates a configuration example in which a plurality of LSPs are mapped onto a plurality of optical subcarriers. As illustrated in FIG. 7A, the case will be described as an example where five types of client data (LSP-1 to LSP-5) are mapped onto four optical subcarriers each of which has a throughput of 100 Gbps. In this case, the five types of data from LSP-1 to LSP-5 are accommodated in a virtual container of ODU4-4v (optical channel data unit).

Figure 7B:
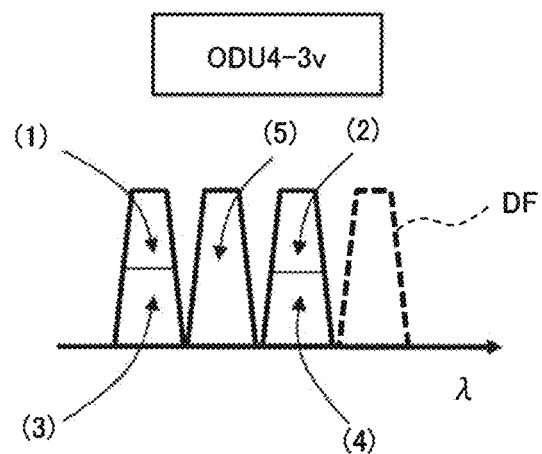
FIG. 7B is a diagram illustrating a wavelength usage situation after a stop of the operation p of the optical subcarrier in the optical network system according to the second example embodiment of the present invention.
Figure 7C:
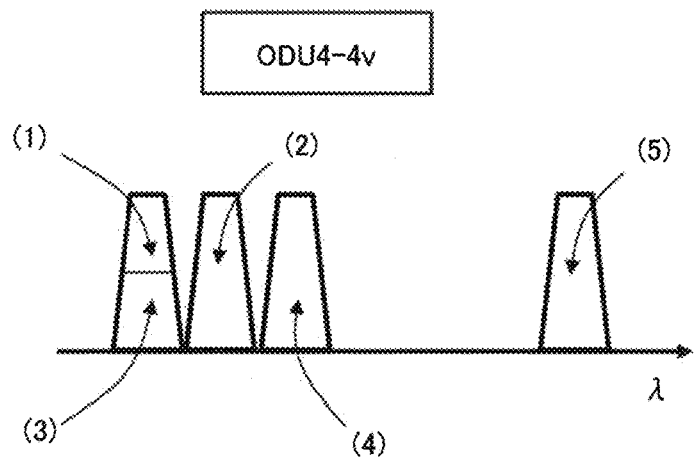
FIG. 7C is a diagram illustrating a wavelength usage situation after reactivating the optical subcarrier in the optical network system according to the second example embodiment of the present invention.

When the client capacity of the client data from LSP-1 to LSP-5 falls below 300 Gbps or less, for example, the data volume of LSP-2 (2) and LSP-4 (4) decreases, LSP-2 (2) is relocated to an optical subcarrier for LSP-4 (4), as illustrated in FIG. 7B. In addition, the most appropriate optical subcarrier for resolution of wavelength defragmentation, that is, an optical subcarrier DF serving as a wavelength defragmentation candidate is selected based on the wavelength usage situation that is managed in the network management device (NMS). Then the client data mounted in the optical subcarrier DF, that is, the client data (5) of LSP-5 in the example illustrated in FIG. 7A, is relocated to the optical subcarrier onto which LSP-2 has been mapped. At the same time, the operation of the optical subcarrier DF is stopped, and the client data are accommodated in ODU4-3v with the number of frame concatenations decremented by one. It is possible to perform the above band control uninterruptedly, as is the case with the first example embodiment.

After that, the resumption of operation process is performed using an increase in the number of client signals as a trigger signal. In this case, as a result of the wavelength defragmentation, the client data (5) of LSP-5 are relocated to an optical subcarrier whose wavelength slot differs from that of the optical subcarrier DF, as illustrated in FIG. 7C.

Even in the resumption of operation process, as is the case with decreasing the number of lanes, the use of the LCAS technology makes it possible to notify a counter node of the change information on the number of lanes (an increase in the number of lanes) and increase the number of lanes uninterruptedly synchronously between the transmitting node and the receiving node. The cross-connect section included in the optical node device at each node performs the process of changing the processing table to switch the LSPs in synchronization with the change in the number of lanes.

As mentioned above, according to the optical network system, the optical node device, and the optical network control method of the present example embodiment, it is possible to perform wavelength defragmentation without data loss due to an instantaneous interruption of a network even when an optical network is operating.

Third Example Embodiment

Next, a third example embodiment of the present invention will be described. An optical node device according to the third example embodiment differs from the optical node device 200 according to the first example embodiment in that a traffic prediction section is included. Because other configurations are the same as those in the first example embodiment, their descriptions are not repeated.

In the optical node device according to the present example embodiment, a cross-connect section starts performing a process when the traffic prediction section predicts the data volume of a client signal to vary in excess of the transmission capacity of a single optical subcarrier. The traffic prediction section can include a data holding section and a data analysis section. The data holding section holds a traffic volume that is detected at specified time intervals. The data analysis section detects a gradient of a traffic variation. The traffic prediction section is disposed in the client-side interface 210 or the cross-connect section 220.

It is configured in the first and second example embodiments that a trigger signal is given off when the decrement of the throughput of the client signal exceeds the throughput of the single optical subcarrier. That is to say, the time when it is determined that the transfer capability of the optical layer becomes excessive is set at the start time of the wavelength defragmentation process.

In contrast, it is configured in the present example embodiment that the traffic prediction section estimates a timing from a variation history of a traffic variation and gives off a trigger signal. The traffic prediction section detects a data volume of a client signal in real time and predicts a client data volume after a certain period of time by a gradient of an increase or decrease in the variation. This enables the cross-connect section 220 to secure more time to perform a process required for the wavelength defragmentation.

As mentioned above, according to the optical node device and the optical network system using the same of the present example embodiment, it is possible to perform wavelength defragmentation without data loss due to an instantaneous interruption of a network even when an optical network is operating.

The present invention has been described above by taking the above-described example embodiments as exemplary examples. However, the present invention is not limited to the above-described example embodiments. In other words, various modes which would be understood by those skilled in the art are applicable to the present invention within the scope of the present invention.

This application is based upon and claims the benefit of priority from Japanese patent application No. 2015-065717, filed on Mar. 27, 2015, the disclosure of which is incorporated herein in its entirety by reference.

REFERENCE SIGNS LIST

1000 . . . optical network system
100 . . . network management device
200 . . . optical node device
210 . . . client-side interface
220 . . . cross-connect section
222 . . . client signal monitor
230 . . . line-side interface
240 . . . controller
300 . . . client-side network
400 . . . core network

The invention claimed is:

1. An optical network control method, comprising:
depending on a variation in a data volume of a client signal to be transmitted using a plurality of optical subcarriers:
changing an active optical subcarrier, of the plurality of optical subcarriers, to be used for transmitting the client signal, synchronously between a transmitting side and a receiving side; and
remapping the client signal onto an active optical subcarrier after having been changed, synchronously between the transmitting side and the receiving side,
wherein the changing of the active optical subcarrier is performed based on respective results of a process of selecting a change candidate optical subcarrier whose operation to be stopped from among the active optical subcarrier, and a process of setting a wavelength of a changed optical subcarrier that becomes the active optical subcarrier due to a change, wherein the process of selecting the change candidate optical subcarrier includes selecting an optical subcarrier with a maximum number of consecutive unused optical subcarriers in an adjacent link in an identical wavelength band as the change candidate optical subcarrier from the plurality of optical subcarriers, and wherein an optical subcarrier with a maximum number of unused optical subcarriers is selected as the change candidate optical subcarrier from optical subcarriers in an adjacent wavelength band when a number of consecutive unused optical subcarriers is equal.

2. The optical network control method according to claim 1, wherein the remapping of the client signal includes a process of remapping the client signal onto the optical subcarrier other than the change candidate optical subcarrier out of the plurality of optical subcarriers.

3. The optical network control method according to claim 1, wherein the process of selecting the change candidate optical sub carrier and the process of setting the wavelength of the changed optical subcarrier are started from the active optical subcarrier with a minimum number of links.

4. The optical network control method according to claim 1, wherein the process of setting the wavelength of the changed optical subcarrier includes setting a wavelength of the changed optical subcarrier at a wavelength of an optical subcarrier with a maximum number of optical subcarriers in use in an adjacent link in an identical wavelength band.

* * * * *